No. 852,529. PATENTED MAY 7, 1907.
J. A. SWINEHART.
WHEEL TIRE.
APPLICATION FILED OCT. 25, 1905.
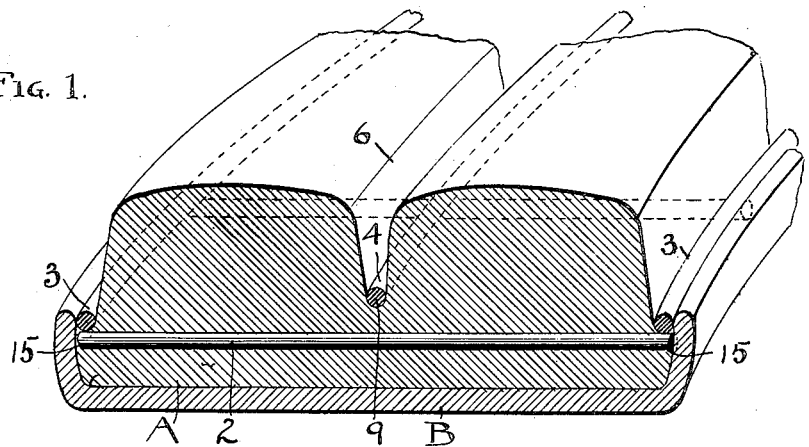
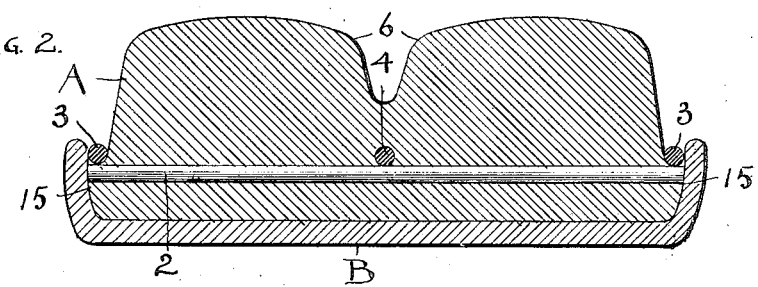
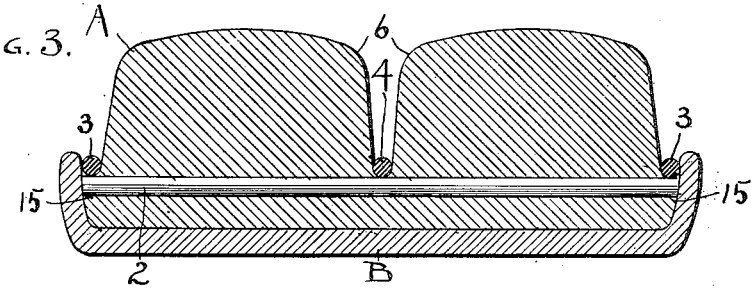
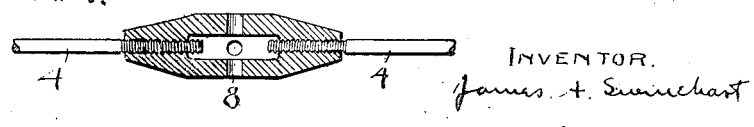
ATTEST.
H. N. Moser.
C. A. Sill.
INVENTOR.
James A. Swinehart
By H. J. Fisher ATTY.

UNITED STATES PATENT OFFICE.

JAMES A. SWINEHART, OF AKRON, OHIO.

WHEEL-TIRE.

No. 852,529.  Specification of Letters Patent.  Patented May 7, 1907.

Application filed October 25, 1905. Serial No. 284,380.

*To all whom it may concern:*

Be it known that I, JAMES A. SWINEHART, a citizen of the United States, residing at Akron, in the county of Summit and State of Ohio, have invented certain new and useful Improvements in Wheel-Tires; and I do declare that the following is a full, clear, and exact description of the invention, which will enable others skilled in the art to which it appertains to make and use the same.

My invention relates to improvements in wheel tires, and the improvement consists in the construction of the tire and in the means adapted to fasten the tire in place upon the wheel rim, all substantially as shown and described and more particularly pointed out in the claims.

My object is embodied in a novel form of tire and locking means therefor adapted to withstand hard usage and heavy loads and yet provide an exceptionally resilient tread, and also adapted to prevent the breaking of the cross wires when smaller sized wires are used, and the cutting of the tire by the longitudinal wires.

In the accompanying drawings Figure 1 is a cross section and perspective view of a portion of a tire and wheel rim embodying my improvement. Fig. 2 is a cross section of a slightly modified form of the tire shown in Fig. 1, and Fig. 3 is a similar view showing a further slight modification. Fig. 4 is a detail of the connecting nut for the meeting ends of a longitudinal locking wire.

Preliminary to a detailed description of my improvement, I wish to state that I am aware that certain features of construction shown by me are not new but are such as are in common use. Thus, referring to the drawings, it is seen that a tire A having cross wires 2 within its base is not new, nor am I the first to use longitudinal wires 3 adapted to rest upon the ends of cross wires 2 to lock the tire in place within channel rim B. Others have also employed a centrally located wire 4 to prevent buckling of cross wires 3. But I believe it is novel and original with me to provide tire A with a peripheral groove 6 axially in line with wire 4, whereby the cutting of the tire by wire 4 is prevented and the life and durability of the tire is prolonged and its carrying capacity increased. Further, a wide tire thus centrally divided by groove 6 provides for a more resilient tread than if made without.

In practice, it has been found that when side wires 3 are brought to place over the ends of cross wires 2, said cross wires will naturally buckle or bow upwardly centrally between their ends. The wheel in its revolution brings the weight centrally upon the cross wires and obviously bends or straightens them at each revolution. This repeated bending of the wire crystallizes the same and the wire breaks and allows the tire to puff up in the center and draw away from the rim. To prevent this it has been customary to employ extremely heavy cross wires 2 which would partially remedy the trouble. Heavy cross wires 2 displace too much rubber and impair the strength of the tire. A central wire 4 permits the use of light and small sized cross wires, but a central longitudinal wire 4 is in the direct line of load in all known constructions and cuts the tire from wire to surface within short periods of service. A central groove 6 localizes the load at two peripheral points upon the tire, one at each side of said groove, and the pressure upon cross wires 2 is also distributed at equal points at each side of its center which fact alone would obviate buckling of cross wires 2. But in extremely wide tires, a central locking member, such as wire 4, is found necessary and when used with groove 6 all danger of cutting of the tire by wire 4 is eliminated, because the strain or pressure is relieved from the tire at this point. Locking member or wire 4 may be embedded within tire A in line with groove 6, as in Fig. 2, or laid within groove 6 itself, as seen in Figs. 1 and 3. The latter mode is the most practicable and preferred because of its convenience in removably securing the tire upon rim B, and to this end wire 4 has its meeting ends reversely threaded and adapted to be connected and drawn together by nut 8, shown in Fig. 4.

In Fig. 1 groove 6 is formed to stop short of cross wires 2 and thereby leave a certain amount of stock 9 between wire 4 and wires 2, whereas in Fig. 3 groove 6 is deep enough to reach cross wire 2 and permit wire 4 to directly rest upon the same. Side wires 3 are adapted to rest upon ribs 15 formed at each side of tire A near its base, and cross wires 2 extend through from side to side of said tire through said ribs. Central wire 4 may be substituted by a cable or rope and if rope were used it would probably be of larger diameter and more fully fill the groove than the wire.

What I claim is:—

1. As a new article of manufacture and sale, a solid rubber tire having separate circumferential tread portions spaced apart and cross wires embedded within the base of said tire, longitudinal wires engaging over the ends of said cross wires, and means engaging said cross wires at the middle of said tire transversely.

2. As an article of manufacture and sale, a solid rubber tire having separate circumferential tread portions and a groove between said portions, cross wires within the base of said tire, and a circumferential locking wire in the plane of said groove and above said cross wires.

3. A solid rubber tire having a circumferential groove in its periphery and cross wires within its base, in combination with a wheel rim, and a longitudinal locking member adapted to lie within said groove and hold said tire upon said rim.

4. A solid rubber tire having separated tread portions, and cross wires for said tire, in combination with a wheel rim adapted to seat said tire, side locking members for said tire and rim, and a central locking member adapted to lock said tire centrally between the sides of said rim.

5. The combination with a wheel felly and a multiple tread tire mounted thereon, said tire having cross-pins embedded in its base portion, of a fastening wire surrounding said tire and lying between adjacent tread portions thereof.

In testimony whereof I sign this specification in the presence of two witnesses.

JAMES A. SWINEHART.

Witnesses:
H. F. SIEGRIST,
C. O. BAUGHMAN.